United States Patent [19]
Devanathan et al.

[11] Patent Number: 5,741,455
[45] Date of Patent: Apr. 21, 1998

[54] INERT GAS HEATED COMPRESSION MOLDING PROCESS AND APPARATUS

[75] Inventors: Thirumalai N. C. Devanathan, Warsaw, Ind.; Karthik Ramani, Purdue University, School of Mechanical Engineering, Advanced Material Design, and Processing, West Lafayette, Ind. 47907-1288

[73] Assignees: Purdue Research Foundation, Warsaw; Karthik Ramani, W. Lafayette, both of Ind.

[21] Appl. No.: 569,537

[22] Filed: Dec. 8, 1995

[51] Int. Cl.$^6$ .............. B27N 3/18; B29C 41/46; B29C 43/52
[52] U.S. Cl. .............. 264/319; 264/85; 264/DIG. 51; 425/407; 425/DIG. 20
[58] Field of Search .............. 264/85, 319, DIG. 51; 425/407, DIG. 20

[56] References Cited

U.S. PATENT DOCUMENTS

| | | | |
|---|---|---|---|
| 3,277,524 | 10/1966 | Silver | 425/DIG. 20 |
| 3,417,268 | 12/1968 | Lace | 310/27 |
| 3,439,198 | 4/1969 | Lee | 310/13 |
| 3,666,977 | 5/1972 | Helms et al. | 310/13 |
| 3,743,870 | 7/1973 | Hunt | 310/13 |
| 4,268,241 | 5/1981 | Rees et al. | 425/549 |
| 4,268,243 | 5/1981 | Koshkin et al. | 425/575 |
| 4,269,588 | 5/1981 | Nogai | 425/545 |
| 4,274,818 | 6/1981 | Montgomery et al. | 264/101 |
| 4,552,715 | 11/1985 | Ando et al. | 264/309 |

FOREIGN PATENT DOCUMENTS

| | | | |
|---|---|---|---|
| 0 484 778 A2 | 5/1992 | European Pat. Off. | B29C 67/14 |
| 25 20 497 A1 | 12/1975 | Germany | B29C 3/00 |
| 35 14 022 C1 | 7/1986 | Germany | B29C 67/04 |
| 36 37 905 A1 | 5/1988 | Germany | B29C 43/02 |
| 38 33 548 A1 | 4/1990 | Germany | B29C 67/04 |
| 38 40 355 A1 | 6/1990 | Germany | B29C 67/04 |

Primary Examiner—David W. Wu
Attorney, Agent, or Firm—Todd A. Dawson

[57] ABSTRACT

The invention is directed to a molding apparatus, including a cylinder having an interior sidewall and a fluid inlet, and defining an inner cavity. A porous plate is disposed within the inner cavity, and is disposable in a loading position wherein the inner cavity is divided into a fluid flow chamber and a material chamber. A ram having an outside diameter which is less than the diameter of the cylinder interior sidewall is slidable within the cylinder.

2 Claims, 2 Drawing Sheets

INERT GAS HEATED COMPRESSION MOLDING PROCESS AND APPARATUS

BACKGROUND OF THE INVENTION

1. Field of the Invention

The present invention relates to molding of plastic materials, and, more particularly, relates to molding of polymeric materials which may be used, e.g., to form orthopaedic implants.

2. Description of the Related Art

Conventional molding systems, such as compression molding systems, injection molding systems and the like, typically include a device for heating the walls or platens of the mold to thereby impart heat via conduction to the moldable material disposed therein. The moldable material may be in the form of a plastic or polymeric compound, such as flakes of a polymeric compound which are introduced into the inner cavity of the mold. A conventional heating device may be an induction heating device in the form of induction coils disposed within the platens of the mold.

Such conventional molding systems and apparatus have two primary drawbacks. First, heating the moldable material via conduction requires that heat be applied to the moldable material for a long period of time in order to ensure that the moldable material at the inner most part thereof reaches the melt temperature and thereby assures adequate bonding between the discrete flakes or particles. This results in a time consuming manufacturing process, with relatively low output rates.

Second, certain moldable materials such as some plastics may be susceptible to thermal degradation if maintained at a high temperature (e.g., near the melt point) for an extended period of time. Because of the slow processing time caused by the heating via conduction as indicated above, plastic parts which are molded using conventional systems or apparatus may therefore exhibit undesirable characteristics caused by the prolonged cycle times, especially at the outer surfaces where the part is in contact with the mold platens.

What is needed in the art is a molding system and apparatus which reduces manufacturing cycle times, increases manufacturing output, and results in molded parts having improved characteristics.

SUMMARY OF THE INVENTION

The present invention provides a molding apparatus including a porous plate which is disposed within an inner cavity of the mold. A hot, inert gas passes through the porous plate and into the inner cavity of the mold, where the moldable material disposed therein is heated primarily via convection caused by the hot, fluid flow therethrough.

The invention comprises, in one form thereof, a molding apparatus, including a cylinder having an interior sidewall and a fluid inlet, and defining an inner cavity. A porous plate is disposed within the inner cavity, and is disposable in a loading position wherein the inner cavity is divided into a fluid flow chamber and a material chamber. A ram having an outside diameter which is less than the diameter of the cylinder interior sidewall is slidable within the cylinder.

An advantage of the present invention is that manufacturing cycle times are reduced.

A further advantage is that improved physical qualities of the molded part are provided because of reduced thermal degradation of the moldable material during manufacturing.

Yet another advantage is that the molding system and apparatus can be used for orthopaedic applications, such as articulating surfaces and bearing components of orthopaedic implants.

A still further advantage is that the method of the present invention can be used with different molding apparatus, such as compression molding apparatus, injection molding apparatus, and the like.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
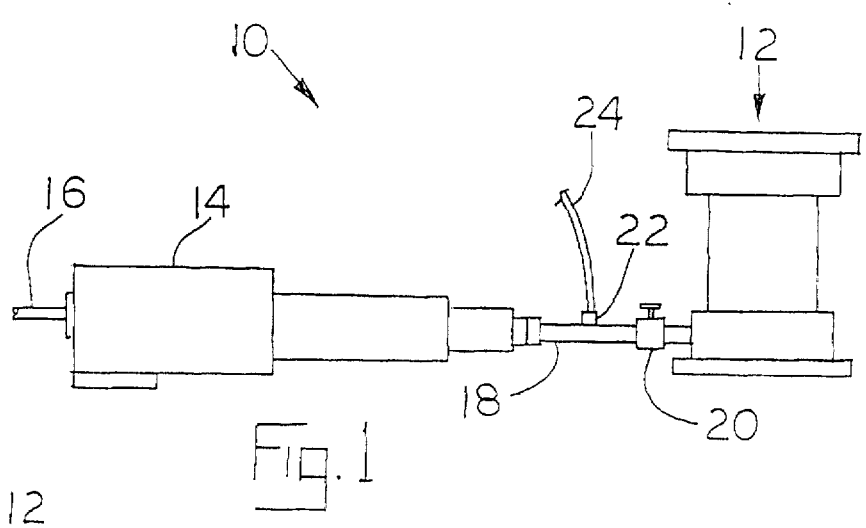
FIG. 1 is a schematic illustration of one embodiment of the molding system of the present invention.
Figure 2:
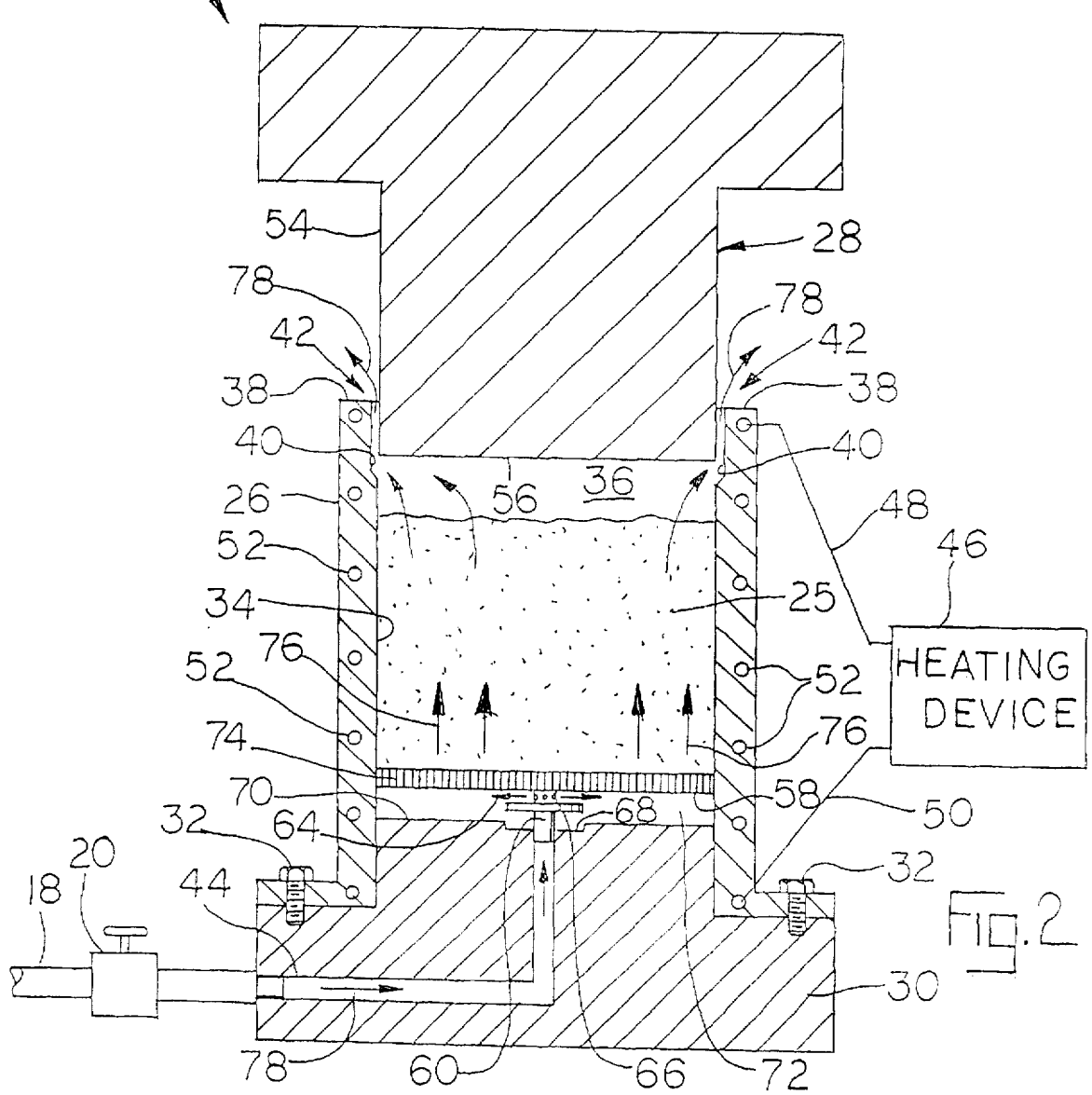
FIG. 2 is a sectional view of the mold assembly shown in FIG. 1, with the ram in an upward position.
Figure 3:
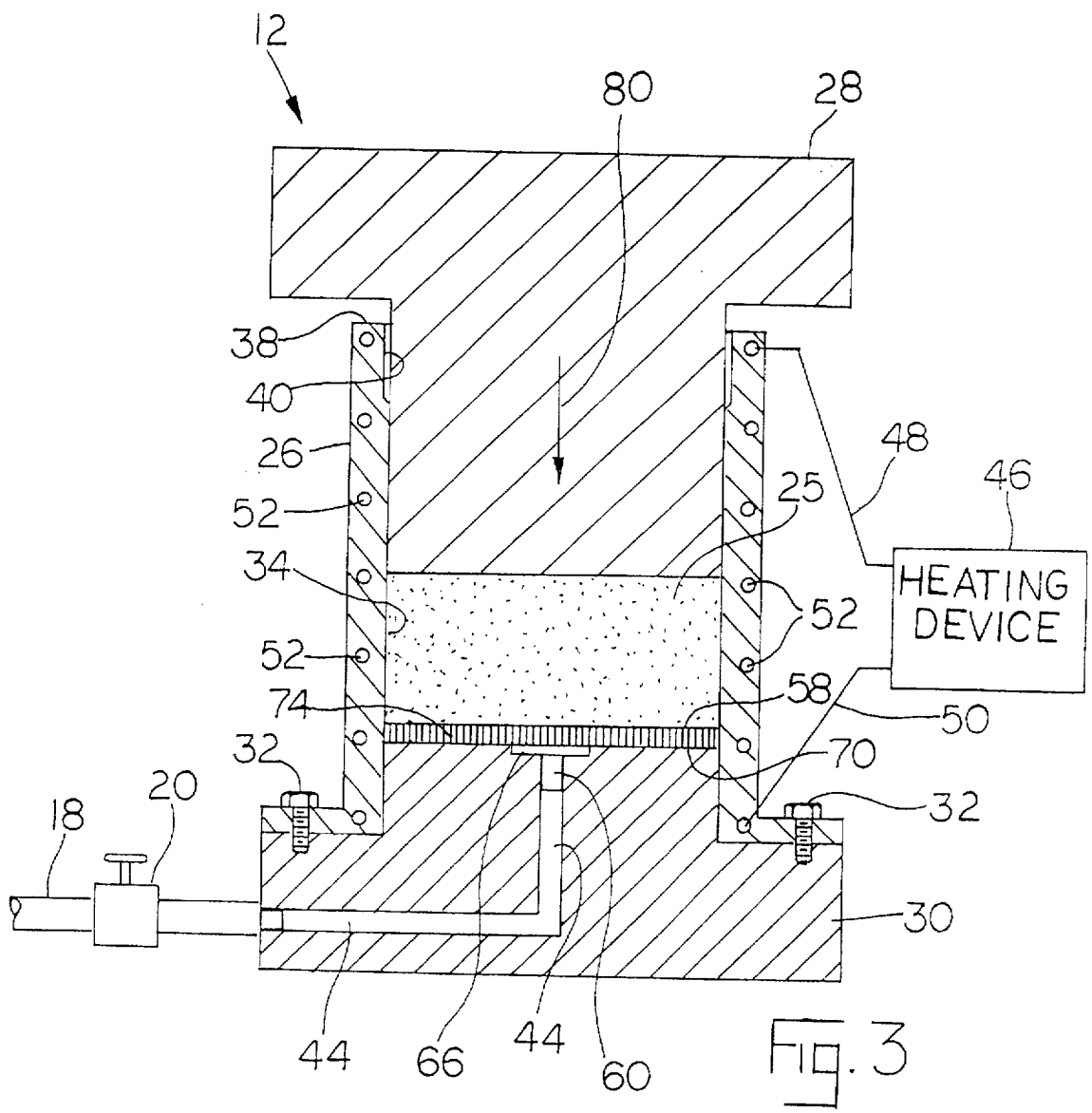
FIG. 3 is a sectional view of the mold assembly shown in FIGS. 1 and 2, with the ram in a downward position.

Referring now to the drawings and more particularly to FIG. 1, there is shown an embodiment of a molding system 10 including a molding apparatus 12. Molding system 10 includes a torch 14 which is connected to a source of gas via an inlet line 16. Gas flowing through inlet line 16 is preferably an inert gas such as nitrogen. Torch 14 heats the inert gas entering at inlet line 16, and has an outlet line 18 which is in communication with an interior of molding apparatus 12, as will be described hereinafter. A valve 20 is disposed between torch 14 and molding apparatus 12 in outlet line 18. Valve 20 is used to control the flow of hot, inert gas into molding apparatus 12. A thermocouple 22 is disposed within or in communication with outlet line 18 and provides an indication of the temperature of the hot, inert gas flowing therethrough. Thermocouple 22 is connected via line 24 to a device for displaying or recording data which is outputed by thermocouple 22, such as a microprocessor, meter or the like. Referring now to FIGS. 2 and 3, molding apparatus 12 shown in FIG. 1 is illustrated in greater detail. Molding apparatus 12 is a compression molding apparatus in the embodiment shown in the drawings. However, it is also to be understood that the present invention may be used with other than a compression molding apparatus. For example, molding apparatus 12 can be in the form of an injection molding apparatus, or other molding apparatus. Likewise, in the embodiment shown, moldable material 25 disposed within molding apparatus 12 is preferably in the form of a plastic, such as a polymeric compound, and particularly such as ultra-high molecular weight polyethylene (UHMWP). However, it is also to be understood that different moldable materials which are capable of being brought at or near a melting temperature or consolidation temperature thereof when disposed within molding apparatus 12 are also possible and within the scope of this invention.

Molding apparatus 12 is generally in the form of a mold defined by a cylinder 26 and a ram 28. Cylinder 26 is attached to and includes a base 30 using a suitable attachment method, such as by bolts 32. Of course, it will be appreciated that cylinder 26 and base 30 can be formed as an integral unit. Cylinder 26 has an interior sidewall 34 defining an inner cavity 36 for receiving the moldable material therein. At a distal end 38 of cylinder 26 is an enlarged diameter section 40 which defines a fluid outlet 42 when ram 28 is in the upper position as shown in FIG. 2. Disposed within base 30 is a fluid inlet 44 which is in communication with each of hot, inert gas outlet line 18 and inner cavity 36. Fluid inlet 44 is shown as being in communication with bottom 70 of base 30 in the embodiment shown in the drawings. However, it is also to be understood that fluid inlet 44 can be disposed in interior sidewall 34 and/or bottom 70.

Cylinder 26 also optionally includes a heating device 46 which is preferably in a form of an induction heater. Heating device 46 is used to apply heat to cylinder 26, such that cylinder 26 may be increased to or maintained at a predetermined temperature. Heating device 46, which is schematically shown in the embodiment of FIGS. 2 and 3, is connected to cylinder 26 via lines 48, 50 and coil 52 within cylinder 26.

Ram 28 has an outside diameter 54 which is slightly less than the diameter of interior sidewall 34, such that ram 28 is slidable within cylinder 26. Ram 28 has a predetermined surface 56 at a distal end thereof, which is simply shown as a flat surface in the embodiment of FIGS. 2 and 3. Predetermined surface may be formed, e.g., corresponding to the shape of an articulating surface of an orthopaedic implant if molding apparatus 12 is used for an orthopaedic application.

In the embodiment shown in FIGS. 2 and 3, ram 28 is not attached to a device for applying heat thereto, such as heating device 46. However, it is to be understood that for particular applications it may be necessary and/or desirable to apply heat to ram 28. Alternatively, ram 28 may be maintained in direct contact with cylinder 26 during the heating of cylinder 26, such that heat via conduction is transferred to ram 28.

Figure 4:
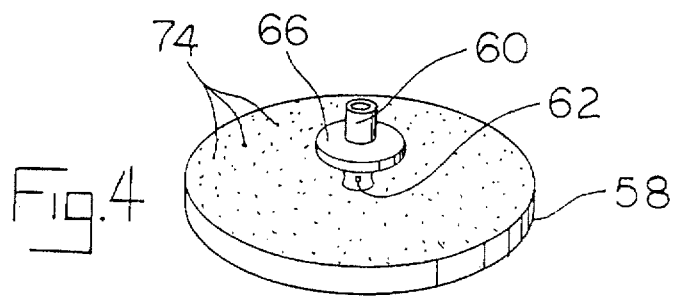
FIG. 4 is a perspective view of the porous plate used in the mold assembly shown in FIGS. 2 and 3, when in an inverted orientation.

In the embodiment shown, fluid outlet 42 is defined by an enlarged diameter section 40 at the distal end 30 of cylinder 26. However, it is also to be understood that molding apparatus 12 may include a different fluid outlet, such as a port within cylinder 26 which is in communication with inner cavity 36 when ram 28 is in the upper position as shown in FIG. 2, and is covered by ram 28 when in the downward position shown in FIG. 3. Disposed within inner cavity 36 is a porous plate 58 (FIGS. 2–4). Porous plate 58 has a stem 60 which is attached thereto. Stem 60 is sized and configured to slidably fit within fluid inlet 44, as shown in FIGS. 2 and 3. Stem 60 has a plurality of radial openings 62 (FIGS. 2 and 4) therein, through which the hot, inert gas may flow, as indicated by directional arrow 64 in FIG. 2. A washer 66 frictionally but yet slidably engages the outside diameter of stem 60. Base 30 has a recess 68 which is sized to receive washer 66 therein. For clarity and ease of illustration purposes, washer 66 is shown slightly above its normal location in recess 68 in FIG. 2.

Porous plate 58 is movable within inner cavity 36 between a loading position shown in FIG. 2 and a pressed position shown in FIG. 3. When in the loading position (FIG. 2), porous plate 58 is disposed above and in spaced apart relationship to a bottom 70 of base 30. On the other hand, when in the pressed position (FIG. 3), porous plate 58 is disposed above and against each of bottom 70 and fluid inlet 44. Porous plate 58 is maintained in the loading position (FIG. 2) with the use of washer 66. That is, washer 66 may be disposed within recess 68 and frictionally engages stem 60 to thereby hold porous plate in spaced apart relationship relative to bottom 70. Porous plate 58 is moved to the pressed position shown in FIG. 3 by the downward force of ram 28 which slides stem 60 in a downward direction relative to each of washer 66 and fluid inlet 44.

Porous plate 58 defines a material chamber corresponding to a portion of inner cavity 36 above porous plate 58, in which moldable material 25 may be disposed. The material chamber of inner cavity 36 is disposed on a side of porous plate 58 which is generally opposite from fluid inlet 44. When a movable porous plate 58 is used as represented by molding apparatus 12 of the drawings, porous plate 58 also defines a fluid flow chamber 72 when in the loading position of FIG. 2, through which the hot, inert gas may flow.

Porous plate 58 includes a plurality of pores 74 therein allowing the hot, inert gas to flow from fluid flow chamber 72 to material chamber 36, as indicated by arrows 76 (FIG. 2). Pores 74 are sized according to the viscosity of the moldable material 25 when it or near the melting temperature, such that fluidized moldable material 25 does not flow into pores 74. For example, if moldable material 25 is in the form of UHMWP, it has been found that an average pore size of approximately 40 micrometers (40 μm) allows sufficient gas flow through porous plate 58, while preventing the flow of fluidized UHMWP 25 into pores 64 when at or near the melting temperature.

In the embodiment shown, porous plate 58 is separate from cylinder 26 (including base 30). Because porous plate 58 is against bottom 70 when in the pressed position, porous plate 58 is thus supported by bottom 70 during compression by ram 28. However, it is also to be understood that it is also possible to rigidly attach porous plate 58 to cylinder 26 and/or base 30. Of course, the thickness of porous plate 58 may need to be adjusted accordingly to withstand the compressive forces applied by ram 28.

During use, washer 66 is positioned on stem 60 in spaced apart relationship to the bottom of porous plate 58. Porous plate 58 is placed within inner cavity 36 such that washer 66 is received within recess 68. Porous plate 58 is disposed above bottom 70, thereby defining fluid flow chamber 72 and material chamber or inner cavity 36. Moldable material 25 is placed within material chamber 36, and ram 28 is moved to the position shown in FIG. 2, whereby fluid outlet 42 is defined between ram 28 and cylinder 26. A hot, inert gas, such as nitrogen, is caused to flow through fluid inlet 44 as indicated by directional arrow 78. The hot, inert gas then flows through radial opening 62 as indicated by arrows 64, pores 74 as indicated by arrows 76, and finally through fluid outlet 42 as indicated by arrows 78. Moldable material 25 is heated primarily via convection as the hot, inert gas flows through material chamber 36. The hot gas flow past the particles of moldable material 25 within material chamber 36 causes a quick temperature rise in moldable material 25. Additional heat may also be applied to moldable material 25 via conduction by heating cylinder 26 and/or ram 28. After moldable material 25 is raised to a temperature at or near its melting point, ram 28 is moved in a downward direction as indicated by arrow 80 in FIG. 3. The downward compressive force of ram 28 causes porous plate 58 to move to the pressed position shown in FIG. 3, whereby porous plate 58 is disposed above and against each of fluid inlet 44 and bottom 70. The outside diameter 54 of ram 28 may optionally be sized such that a small amount of hot, inert gas continues to flow between ram 28 and cylinder 26, thereby preventing an inflow of ambient air to material chamber 36 during the molding process. Moldable material 25 is then cooled in known fashion and removed from molding apparatus 12.

In the embodiment shown in the drawings, ram 28 has a predetermined surface 56 which may be configured with a particular desired shape, such as an articulating or bearing surface of an orthopaedic implant. However, it is to be understood that it is also possible and within the scope of this invention to configure other interior surfaces of molding apparatus 12 with a predetermined shape. For example, it may be desirable for a particular application to configure porous plate 58 and/or interior sidewall 34 with a predetermined shape other than that shown in the drawings.

Further, in the embodiment shown in the drawings, porous plate 58 is disposed within cylinder 26 to assist in the diffusion of the hot, inert gas through moldable material 25. However, it may be desirable for certain applications to eliminate porous plate 58 and substitute other structure such as an agitator, vibrator, etc. within molding apparatus 12 for the purpose of assisting in mixing of the gas and fluidization of moldable material 25. For example, an agitator can be use within cylinder 26 during the fluidization of moldable material 25, and removed from cylinder 26 prior to compression with ram 28. Alternatively, cylinder 26 can be formed with a plurality of pores therein for introducing the hot, inert gas into inner cavity 36.

The molding method and apparatus of the present invention, as described above, provides a molded part having improved physical characteristics. With conventional molding apparatus, the heat is applied to the moldable material using conduction from the mold to the moldable material. This may result in a poor melt at the inner part of the moldable material, which in turn may result in a decreased bonding strength between the particles making up the molded part. In contrast, by using a hot gas which imparts heat to the moldable material primarily via convection (and optionally also by conduction), the moldable material is more uniformly brought to or near its melting temperature, resulting in a superior molded part.

Additionally, since the moldable material is brought to or near its melting temperature relatively quickly compared to conventional methods and apparatus, thermal degradation of the molded part caused by prolonged placement and heating within the mold is avoided.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of compression molding a moldable material, comprising the steps of:

providing a compression mold having an inner cavity and a fluid inlet in communication with said inner cavity, said inner cavity having an initial volume and a compressed volume wherein said compressed volume is less than the initial volume;

providing compression means within said compression mold shiftable between first and second positions to decrease the volume of the inner cavity from said initial volume to said compressed volume;

providing a porous plate within said inner cavity of the compression mold in association with said fluid inlet, whereby a fluid may be introduced into said inner cavity of the compression mold through said fluid inlet and said porous plate;

introducing the moldable material into said inner cavity of the compression mold when said compression means is in its first position with said inner cavity having its initial volume;

heating and fluidizing said moldable material within said inner cavity of the compression mold by transporting a hot inert gas through said fluid inlet, porous plate and inner cavity of the compression mold; and compressing the moldable material within said inner cavity of said compression mold by shifting said compression means from its first position toward its second position wherein the volume within said inner cavity is reduced from said initial volume to said compressed volume.

2. The method of claim 1, comprising the further steps of:

positioning said porous plate in a loading position during said heating step; and moving said porous plate to a pressed position during said compressing step.

* * * * *

UNITED STATES PATENT AND TRADEMARK OFFICE
CERTIFICATE OF CORRECTION

PATENT : 5,741,455

DATED : April 21, 1998

INVENTOR(S) : Thirumalai N. C. Devanathan, et al

It is certified that error appears in the above-identified patent and that said Letters Patent is hereby corrected as shown below:

On the title page, item [73], should read –Purdue Research Foundation, W. Lafayette; Zimmer, Inc., Warsaw, both of Ind.--.

Signed and Sealed this

Fifteenth Day of December, 1998

*Attest:*

BRUCE LEHMAN

*Attesting Officer*     *Commissioner of Patents and Trademarks*